3,163,673
METHOD OF PREPARING DIBASIC ACIDS FROM NAPHTHALENE AND PRODUCTS OBTAINED

Giampaolo Chiusoli, Novara, and Francesco Minisci and Adolfo Quilico, Milan, Italy, assignors to Montecatini Società Generale per l'Industria Mineraria e Chimica, a corporation of Italy
No Drawing. Filed May 13, 1957, Ser. No. 658,525
Claims priority, application Italy May 15, 1956
3 Claims. (Cl. 260—537)

This invention relates to a method of preparing dibasic acids, particularly delta-keto-sebacic acid and delta-hydroxy-sebacic acid, by subjecting naphthalene to the chemical action of air and oxygen. The products obtained thereby were found to represent important starting materials for making polymers, delta-hydroxy-sebacic acid being particularly suitable for preparing polyamid polymers and co-polymers.

The process according to the present invention is based upon the following reactions:

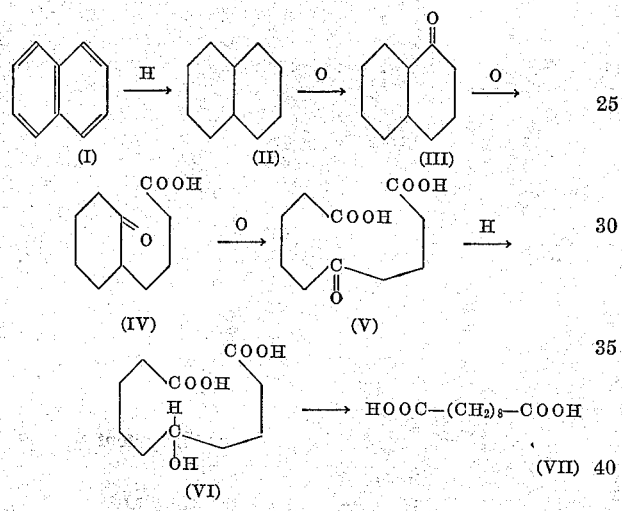

It is known that naphthalene (I) can be converted into tetralin (VIII) and decalin (II) by means of hydrogenation. Starting with tetralin, tetralone (IX) can be obtained, by means of oxidation with air (Balaceanu, Acts of the 4th Petroleum Congress, 1955, IV/B). From the latter, α-decalone (III) is obtained by selective reduction with hydrogen:

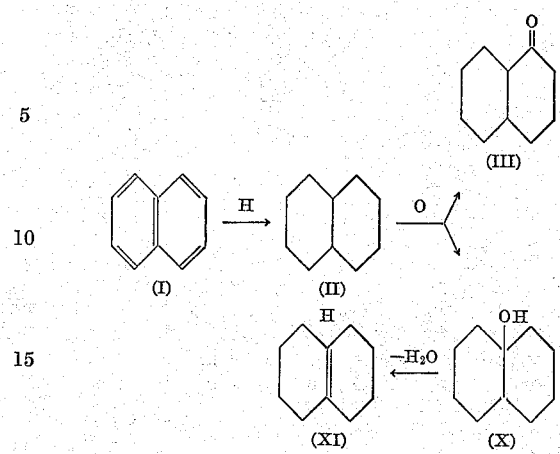

Decalone (III) can be also prepared from decalin (II) by direct oxidation with air. In such a case, a substantial amount of the reaction product consists of 9-oxy-decalin (X).

Moreover, it has been found that, because of the facility at which 9-oxy-decalin can be dehydrated (especially when starting from the trans-form of the decalin), it is possible to return the resulting octalin (XI) to the naphthalene hydrogenation stage so that, as the only product of the oxidation, decalone is obtained.

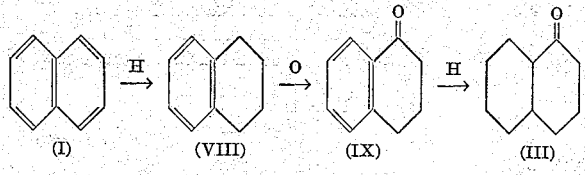

α-Decalone, prepared in this manner, both in the cis- and trans-form and in mixtures thereof, can be oxidized by means of potassium permaganate or chromium trioxide to yield delta-keto-sebacic acid (V).

It is the principal object of the present invention to prepare dibasic acids, particularly delta-keto- and delta-hydroxy-sebacic acid from naphthalene by means of a new process.

It is another object of the invention to provide in said dibasic acids valuable starting materials for the preparation of polymerization and co-polymerization products.

It is still another object to provide such polymerization and co-polymerization products.

These and other objects and advantages will appear more clearly from the herein-following detailed description and examples.

According to the present invention, decalone is oxidized continuously or batch-wise under atmospheric conditions, but preferably under pressure, by means of air or oxygen which may be diluted with nitrogen, to cyclo-hexanone-butyric acid (IV), i.e. γ-(2-keto-cyclohexyl) butyric acid, and to delta-keto-sebacic acid (V), in a liquid phase reaction and, if desired, in the presence of oxidation catalysts such as peroxides, cobalt-, iron-, manganese-, or chromium-salts and the like. The temperature is kept at 70 to 170° C., but preferably between 80 to 130° C. and the oxygen pressure or oxygen partial pressure at 5 to 25 atmospheres.

The process is preferably carried out in two stages, because the oxidation of decalone yields primarily cyclo-hexanone-butyric acid.

After this acid has been removed from the mixture of acids resulting from the oxidation, further conversion to keto-sebacic acid takes place under the same reaction conditions. The latter can be isolated from the other acids, by washing with chloroform or other solvents in which it does not dissolve. The oxidation is preferably carried out in an aqueous medium, optionally in the presence of solvents, e.g. acetic acid, and of emulsifying agents. Cyclo-hexanone-butyric acid can be further oxidized by means of hydrogen peroxide, at room temperature. A peroxide, which can be decomposed by means of alkalies or acids, is obtained.

delta-keto-sebacic acid can be used as a monomer in polymerization and co-polymerization processes. Particularly upon condensation with hexamethylene diamine a salt is obtained which is able to undergo polymerization so as to yield a plastic material.

Upon reduction with hydrogen under pressure and in the presence of catalysts, keto-sebacic acid is converted into hydroxy-sebacic acid (VI)

The latter is a white solid, which melts at 103° C. and forms a lacetone

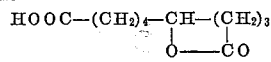

from which it can be restored by means of an alkali. The acid is soluble in water, insoluble into chloroform and slightly soluble in ethyl ether.

The salt formation and polycondensation are carried out according to known processes for preparing polyamides. The resulting polymer shows hydrophilic characteristics.

The same result is attained by forming a salt between the lactone of hydroxy-sebacic acid and hexamethylene-diamine and polymerizing the resulting salt.

After reduction to delta-hydroxy-sebacic acid, delta-keto-sebacic acid can be further hydrogenated to sebacic acid, at temperatures above 200° C., preferably at a temperature ranging from 250 to 300° C. Previous reduction to hydroxy-sebacic acid is necessary, in order to avoid intra-molecular condensation reactions of the carbonyl group.

Example 1

Naphthalene is hydrogenated to yield decalin in the known manner. The latter is oxidized in a stream of oxygen or air or oxygen diluted with nitrogen and in the presence of one of the previously mentioned catalysts.

The resulting mixture, consisting of 9-oxy-decalin, and decalone, is distilled. Together with un-converted decalin and α-decalone, 9-oxy-decalin is obtained which, by means of dehydration, is converted into octalin, which is then returned to the stage at which naphthalene is hydrogenated to decalin.

Example 2

One kg. of α-decalone in the trans form is oxidized by means of air at 100° C. and under a pressure of 100 atmospheres. The oxidation proceeds until about 30 percent of the decalone is converted. 320 g. of acids, containing 120 g. of cyclo-hexanone-butyric acid, are obtained.

Example 3

One kg. of trans α-decalone, emulsified in 4 kg. of water, is oxidized by means of air and in the presence of cobalt naphthenate, in an autoclave, at a temperature of 90° C., and under a pressure of 50 atmospheres. The oxidation is permitted to proceed until ¼ of the decalone is oxidized. The acid portion (250 g.) contains 125 g. of cyclo-hexanone-butyric acid and 12 g. of keto-sebacic acid.

Example 4

One kg. of cyclo-hexanone-butyric acid is oxidized with air for 6 hours, at 100° C., in the presence of water and cobalt toluate, under 100 atmospheres pressure. 0.4 kg. of delta-keto-sebacic acid are obtained and 0.15 kg. of the original acid are recovered.

Example 5

One kg. of cyclo-hexanone-butyric acid is oxidized with hydrogen peroxide, in alkaline solution, at a temperature of 30° C. Upon acidification and decomposition with 50% sulphuric acid, 0.8 kg. of delta-keto-sebacic acid are obtained.

Example 6

The crude product resulting from the oxidation of decalone, according to the procedure of either Example 2 or 3, is steam distilled. Distilled decalone is recycled. The residual acids are further oxidized with oxygen or air, under the conditions described in Example 4. The acids produced by this oxidation are treated with chloroform whereby delta-keto-sabacic acid remains un-dissolved. From 1 kg. of crude acids, about 0.25 kg. of keto-sebacic acid is obtained.

Example 7

One kg. of keto-sebacic acid, in an alkaline solution, is reduced with hydrogen and Raney nickel at 130° C. under a pressure of 100 atmospheres. 0.95 kg. of delta-hydroxy-sebacic acid are obtained.

Example 8

One kg. of keto-sebacic acid, in alkaline solution, is reduced under the same conditions as specified in Example 7. Afterwards, the temperature is increased to 270° C. and the pressure to 220 atmospheres. After 8 hours, 0.15 kg. of sebacic acid and 0.75 kg. of hydroxy-sebacic acid are obtained.

Example 9

Hydroxy-sebacic acid and hexamethylene-diamine are dissolved, at an equimolecular ratio, in absolute alcohol. From this mixture, hexamethylene-diamine-hydroxy-sebacate (M.P. 150° C.) crystallizes. This salt is heated to 200° C. in an autoclave, in the presence of water; the temperature is gradually increased and the pressure is maintained at a constant value by venting. The mixture is kept at 250° C. for 15 minutes; then the pressure is slowly released over the period of one hour.

The product is kept one hour longer at 250° C. and is then discharged. It has a melting point of about 175° C. Alternatively, the salt obtained upon condensing hexamethylene-diamine with the lactone of hydroxy-sebacic acid is polymerized in a similar manner.

We claim:

1. A process for making delta-keto-sebacic acid comprising treating gamma-(2-ketocyclohexyl) butyric acid with hydrogen peroxide in alkaline solution and decomposing the resulting peroxide with an acid.

2. A process of making delta-keto-sebacic acid comprising treating gamma-(2-ketocyclohexyl) butyric acid with hydrogen peroxide in alkaline solution and decomposing the resulting peroxide with sulfuric acid.

3. A process of making delta-keto-sebacic acid comprising treating gamma-(2-ketocyclohexyl) butyric acid with hydrogen peroxide and alkaline solution and decomposing the resulting peroxide with an alkali.

References Cited in the file of this patent
UNITED STATES PATENTS

| | | |
|---|---|---|
| 991,720 | Hofmann et al. | May 9, 1911 |
| 2,176,074 | Jacobson | Oct. 17, 1939 |
| 2,279,745 | Stevenson | Apr. 14, 1942 |
| 2,338,114 | Isbell | Jan. 4, 1944 |
| 2,377,246 | Kyrides | May 29, 1945 |
| 2,388,813 | Allen et al. | Nov. 13, 1945 |
| 2,499,797 | Theobald | Mar. 7, 1950 |
| 2,594,355 | Schwenk et al. | Apr. 29, 1952 |
| 2,617,835 | Curtin | Nov. 11, 1952 |
| 2,665,303 | Gomroth | Jan. 5, 1954 |
| 2,815,375 | Kamlet | Dec. 3, 1957 |

OTHER REFERENCES

Huckel et al.: Ann. Chem., Justus Liebigs, 441, 21–24 (1925).

Stoll et al.: Helv. Chim. Acta 13, 142–143 (1930).

Huckel et al.: Ann. Chem., Justus Liebigs, 502, 146–147 (1933).

Leonard et al.: J. Am. Chem. Soc. 72, 5404–5407 (1950).

Nazarov et al.: Chem. Abstracts 45, 1562 (1951).

Kappeler et al.: Helvetica Chimica Acta, vol. 37, p. 960 (1954).

Holmquist et al.: J. Am. Chem. Soc. 78, 5339–5341 (1956).